United States Patent
Gertner

(10) Patent No.: US 12,366,285 B2
(45) Date of Patent: Jul. 22, 2025

(54) OSCILLATION COMPENSATING METHOD AND DEVICE FOR A STEPPING WHEEL PROPULSION UNIT

(71) Applicant: TETRABOT LLC, Syktyvkar (RU)

(72) Inventor: Dmitrii Alexandrovich Gertner, Syktyvkar (RU)

(73) Assignee: TETRABOT LLC, Syktyvkar (RU)

( * ) Notice: Subject to any disclaimer, the term of this patent is extended or adjusted under 35 U.S.C. 154(b) by 806 days.

(21) Appl. No.: 17/424,615

(22) PCT Filed: Jan. 22, 2020

(86) PCT No.: PCT/RU2020/000024
§ 371 (c)(1),
(2) Date: Jul. 21, 2021

(87) PCT Pub. No.: WO2020/153878
PCT Pub. Date: Jul. 30, 2020

(65) Prior Publication Data
US 2022/0120342 A1    Apr. 21, 2022

(30) Foreign Application Priority Data

Jan. 22, 2019   (RU) .......................... RU2019101727

(51) Int. Cl.
*F16H 35/02*    (2006.01)
*B62D 57/02*    (2006.01)
(Continued)

(52) U.S. Cl.
CPC ............. *F16H 35/02* (2013.01); *B62D 57/02* (2013.01); *F16H 57/0006* (2013.01); *F16H 57/082* (2013.01); *F16H 2035/001* (2013.01)

(58) Field of Classification Search
CPC ....... B62D 57/02; B62D 57/022; F16H 35/02; F16H 57/0006; F16H 57/082; F16H 2035/001
(Continued)

(56) References Cited

U.S. PATENT DOCUMENTS 3,730,287 A * 5/1973 Fletcher ............... B62D 55/247
                                                    180/41
6,478,314 B1   11/2002 Klann
(Continued)

FOREIGN PATENT DOCUMENTS

CN          103192897       7/2013
CN          204279688       4/2015
(Continued)

OTHER PUBLICATIONS

International Search Report issued in PCT/RU2020/000024 dated Jul. 16, 2020 (2 pages).
(Continued)

*Primary Examiner* — Anne Marie M Boehler
(74) *Attorney, Agent, or Firm* — Nixon & Vanderhye PC

(57) ABSTRACT

Mechanisms for converting rotational motion into other types of motion, in particular uniform translational motion, are disclosed, and can be used as an oscillation compensator for stepping wheel propulsion units. An oscillation compensating device for a stepping wheel propulsion unit including supports fastened symmetrically to an output shaft that is fastened for transverse motion is actuated by an input shaft, the output shaft being fastened on the free end of a crank. The output shaft is set into rotation via a variator, which varies the angular velocity of the output shaft according to the current position of the crank and the angular velocity thereof. The need for cam mechanisms and springs in the device can be obviated, the coefficient of friction and the (Continued)

dimensions of the device can be reduced, and both spatial and speed oscillations can be significantly reduced.

16 Claims, 8 Drawing Sheets

(51) Int. Cl.
*F16H 35/00* (2006.01)
*F16H 57/00* (2012.01)
*F16H 57/08* (2006.01)

(58) Field of Classification Search
USPC .................. 180/8.2, 8.3, 8.6; 280/5.2, 5.26
See application file for complete search history.

(56) References Cited

U.S. PATENT DOCUMENTS

| | | | | |
|---|---|---|---|---|
| 8,641,059 | B2* | 2/2014 | Khodor | B62B 1/12 |
| | | | | 280/47.28 |
| 10,806,649 | B1* | 10/2020 | Cox | A61G 5/065 |
| 11,938,991 | B2* | 3/2024 | Fujihara | B62B 3/12 |
| 2002/0179342 | A1 | 12/2002 | Quinn et al. | |
| 2008/0251300 | A1 | 10/2008 | Frankie | |
| 2009/0309319 | A1* | 12/2009 | Kamara | B62B 5/026 |
| | | | | 280/5.26 |
| 2013/0231814 | A1* | 9/2013 | Sarokhan | B25J 9/1694 |
| | | | | 180/7.1 |
| 2013/0274973 | A1* | 10/2013 | Kamara | B62B 5/0026 |
| | | | | 180/7.1 |
| 2015/0272793 | A1* | 10/2015 | Lu | B62K 5/023 |
| | | | | 280/5.26 |
| 2018/0290699 | A1* | 10/2018 | Gertner | B60F 3/0007 |

FOREIGN PATENT DOCUMENTS

| | | |
|---|---|---|
| RU | 2 038 248 | 6/1995 |
| RU | 2 628 285 | 8/2017 |

OTHER PUBLICATIONS

Written Opinion of the International Searching Authority issued in PCT/RU2020/000024 dated Jul. 16, 2020 (4 pages).

* cited by examiner

OSCILLATION COMPENSATING METHOD AND DEVICE FOR A STEPPING WHEEL PROPULSION UNIT

Cross-Reference to Related Applications

This application is the U.S. national phase of International Application No. PCT/RU2020/000024 filed Jan. 22, 2020 which designated the U.S. and claims priority to RU application Ser. No. 20/191,01727 filed Jan. 22, 2019, the entire contents of each of which are hereby incorporated by reference.

Technical Field

The invention relates to mechanisms for converting rotary motion into other types of motion, in particular into uniform translational motion, and is intended to be used as a vibration compensator for wheel-stepper propulsion device.

Background and Summary

In various designs of wheel-stepper propulsion device, it is assumed that various moving supports are used instead of the wheel rim. The simplest version of such a propulsion device is a wheel without a rim, consisting of spokes, on which the propulsion device rests during its movement. The absence of a rim gives a definite advantage when driving on uneven and unstable surfaces, but leads to the occurrence of unwanted vibrations of the axle and the entire structure. To get rid of these vibrations, an additional mechanism is needed—a vibration compensator.

It is known "Chassis for movement on various supporting surfaces with wheel-stepper propulsion device" (patent No. RU2 628 285C2), which offers several options for the compensator of vibrations arising from the movement of the supports. In this patent, the vehicle chassis contain stepper-wheel propulsion device. Each wheel-stepper propulsion device consists of at least three supports fixed on a common shaft symmetrically relative to the axis of rotation of the shaft and obliquely to each other, forming the lateral edges of an imaginary pyramid. In this case, the shaft is located at an angle to the support surface in such a way that no more than two supports from each propulsion device touch the support surface at the same time. Moreover, the shaft is fixed movably with the possibility of transverse movements and is kinematically connected to the oscillation compensator. The vibration compensator is fixed to the chassis.

In one version of the oscillation compensator, an even number of wheel-stepper propulsion device are used, each pair has a common oscillation compensator, which consists of a common lever swinging on a fixed axle, fixed to the chassis frame. In this case, in each pair of wheel-stepper propulsion device, the output shafts are driven into synchronous rotation from a common drive, and the supports on these shafts are installed in antiphase.

The disadvantage of such a mechanism is the mandatory synchronization of the movement of the wheel-stepper propulsion device in its pair, which significantly complicates movement on surfaces with complex relief. In addition, such a scheme of paired arrangement and synchronization of the propulsion device makes it impossible to implement maneuvering by turning individual propulsion device relative to the vehicle chassis.

The closest to the proposed device is a variant of the oscillation compensator (patent No. RU2 628 285C2), in which the rotation of the input shaft is converted into a complex rotational-reciprocating motion of the output shaft, on which the supports are fixed due to the cam mechanism. In this embodiment, the vibration compensator consists of a lever swinging on a fixed axle, fixed to the chassis frame. A hub is fixed at the free end of the lever, in which the bearings rotate on the output shaft. A return spring acts on the top of the lever, and a cam mechanism, consisting of three rollers and rotating on a shaft passing through the chassis frame, acts on the bottom of the lever. The shaft and the cam mechanism are driven from a common drive and rotate synchronously with the same frequency, which makes it possible to smooth out the vertical vibrations of the shaft. The cam mechanism with the help of rollers raises the lever up when the support touching the surface from the inclined position goes to the vertical one, and the return spring lowers the lever down when the support touching the surface from the vertical position moves to the inclined one.

The disadvantage of such a mechanism is the rapid wear of the cam mechanism and the spring, a high coefficient of friction, as well as the presence of significant residual vertical oscillations of the output shaft. In particular, the amplitude of these vibrations is at least 30% of the length of the supports. In addition, the direct transmission of rotation of the input shaft to the output shaft creates significant fluctuations in the speed of movement of the support points at the ends of the supports relative to the mechanism body, since the supports, when rotating, touch the surface at different angles (from 30 to 90 degrees for three supports). This leads to the appearance of a two-fold change in the linear velocity at a constant angular velocity of the input shaft, depending on the current position of the support, and, accordingly, the presence of at least two-fold fluctuations in the load on the input shaft. And finally, the operation of the mechanism assumes constant adhesion of the supports to the surface, which is not always possible.

The objective of the present invention is to create a fundamentally new method and device for compensation of vibrations, in which the disadvantages of the prototype will be eliminated: high wear of parts and coefficient of friction, and also the vertical vibration of the shaft, high-speed vibrations and fluctuations in the load on the output shaft are minimized.

Detailed Description

Figure 1:
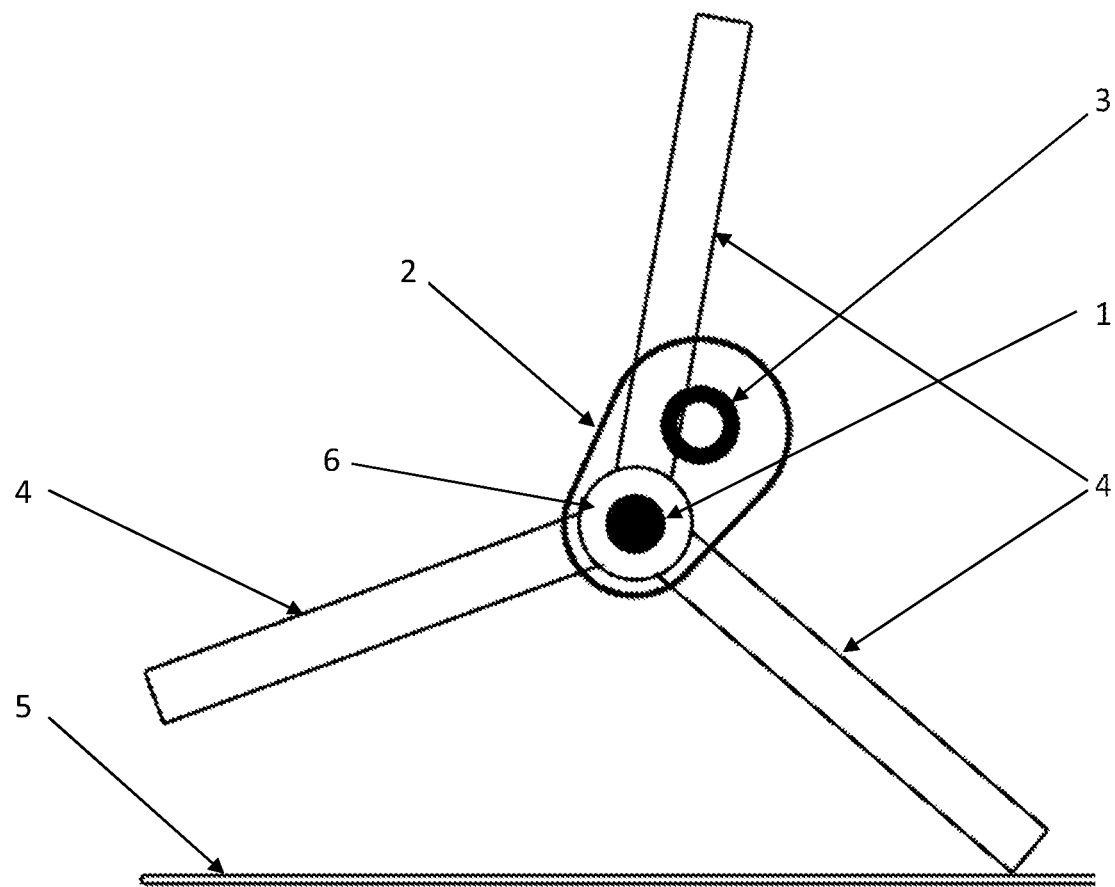
FIG. 1 shows the proposed oscillation compensation device.

The tasks are achieved by the fact that in the proposed oscillation compensation device, the output shaft 1 (FIG. 1)

is fixed on the crank 2, driven in rotation by the input shaft 3. Supports 4 are fixed on the output shaft 1. When the output shaft 1 rotates, one or two supports 4 touch surface 5. The output shaft 1 is driven by the variator 6. The variator 6 changes the angular velocity of the output shaft 1 depending on the current position of the crank 2 and its current angular velocity. In this case, the crank 2 and the output shaft 1 are made with the possibility of rotation in the same direction, and the output shaft 1 rotates more slowly than the crank 2, in particular, when the number of supports 4 is equal to three for one full revolution of the crank 2, the output shaft 1 must turn ⅓ of a turn but with a floating angular velocity. The variator 6 must create the maximum angular speed in the upper position of the crank 2 when one of the supports 4 touching the surface 5 is in a vertical position, and the minimum angular speed in the lower position of the crank 2 when two supports 4 simultaneously touch the surface 5. Subject to these conditions and correctly selected parameters, the solution of the assigned tasks is ensured.

If the output shaft 1 is driven by a separate drive, for example an electric servo, then an electronic variator can be used to change the angular speed of the servo. To regulate the speed of rotation of the servo—the electronic version is connected to an encoder that monitors the current position of crank 2 and its angular velocity relative to the body of the vibration compensation device.

Figure 2:
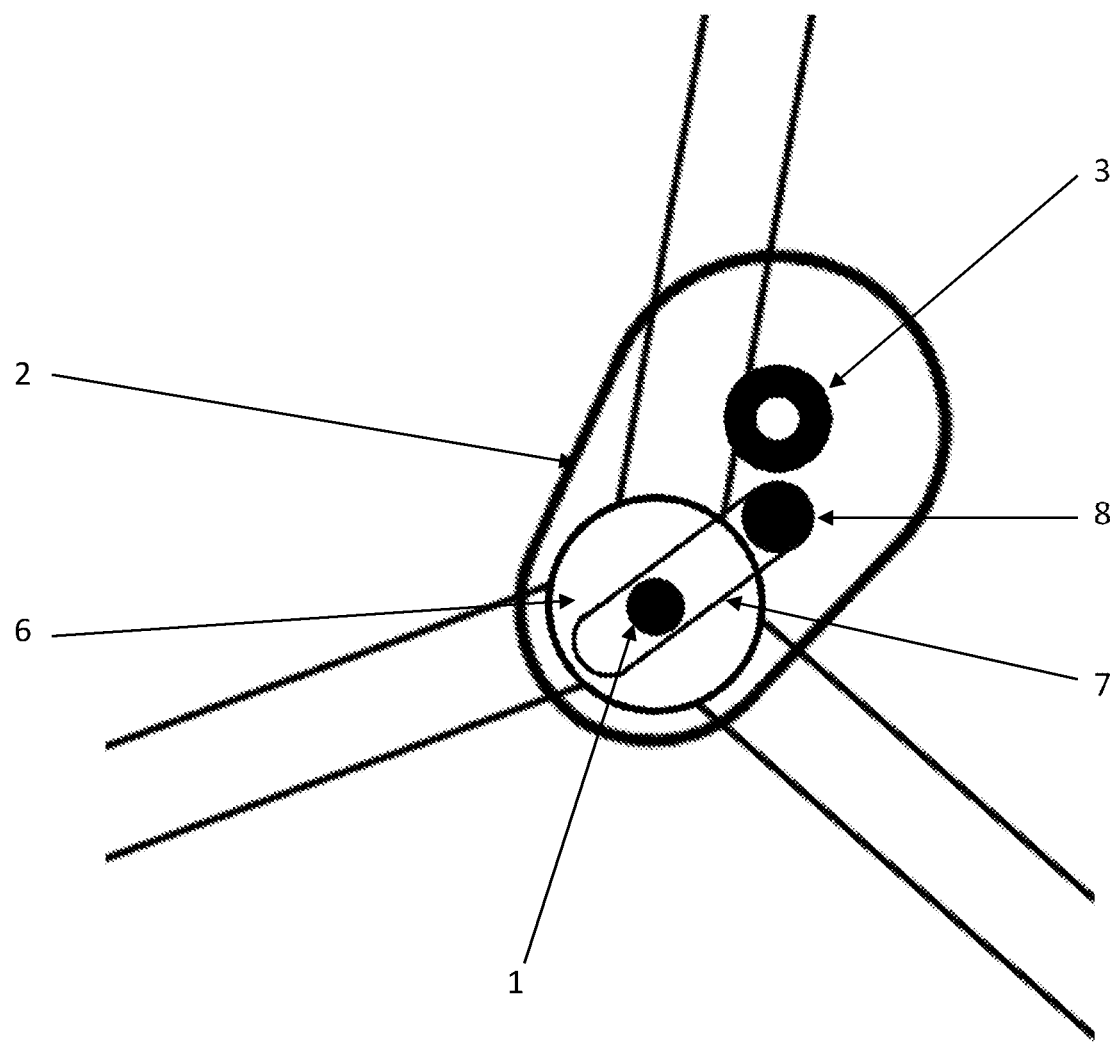
FIG. 2 shows using the control rod to control the variator if the output shaft receives power and is driven into rotation from the input shaft through the transmission and the variator.

If the output shaft 1 receives power and is driven into rotation from the input shaft 3 through the transmission and the variator 6, it is proposed to use the control rod 7 to control the variator 6 (FIG. 2). For this, the axis 8 of the connecting rod 7 must be fixed in the housing of the vibration compensation device at a predetermined distance from the input shaft 3. This distance allows you to adjust the nature of the change in the angular velocity of the output shaft 1. The other end of the connecting rod 7 passes through the axis of the output shaft 1. Thanks to this arrangement, the angle between the connecting rod 7 and the crank 2 changes in accordance with the required change in the angular velocity of the output shaft 1.

Figure 3:
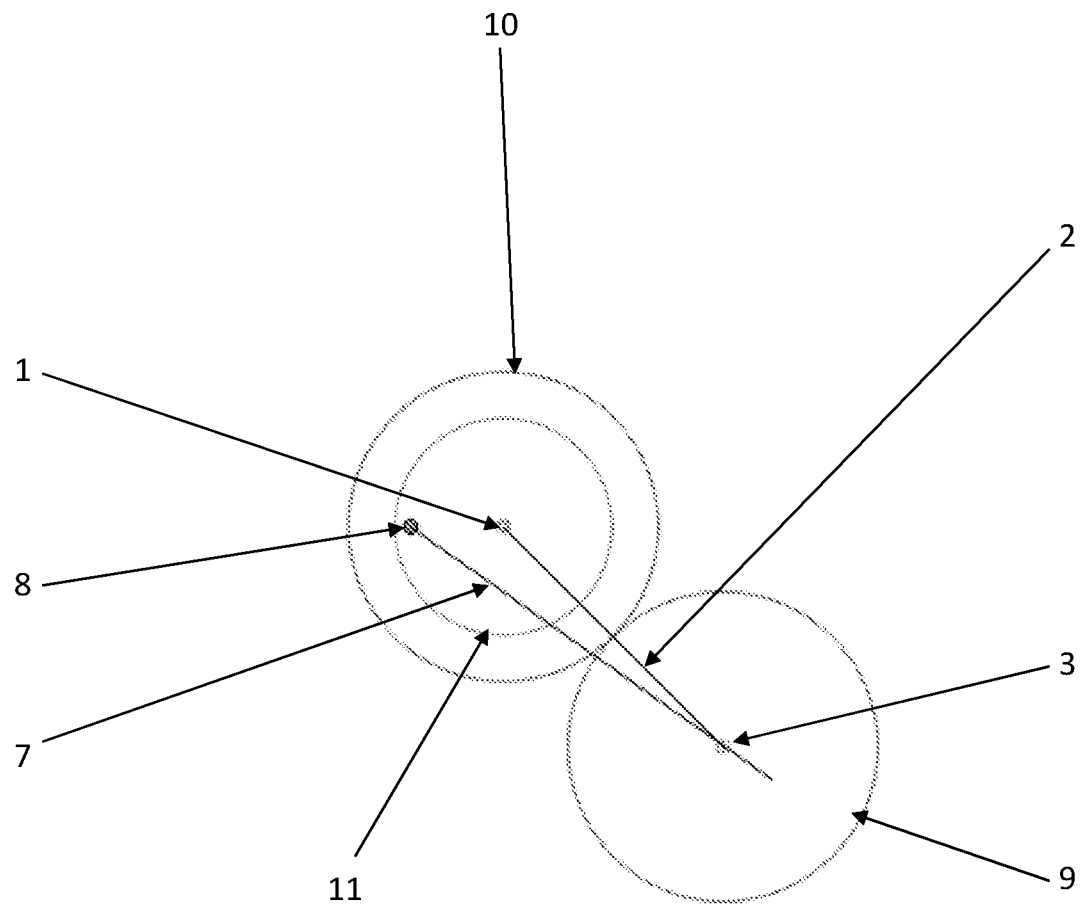
FIG. 3 shows a planetary mechanism.

Another option for controlling the angular speed of the output shaft 1 is possible using a variator 6, consisting of a planetary gear. This planetary mechanism consists of a stationary sun gear 9 (FIG. 3), fixed on the housing of the vibration compensation device coaxially with the input shaft 3 and at least one satellite 10, fixed on the carrier. The diameter of the satellite is suggested to be the same size as the diameter of the sun gear 9. Crank 2 is used as a carrier. The rotation of the satellite can be used to change the angular velocity of the output shaft 1.

Shown below are options in which the variator is replaced by a gearbox controlled by a connecting rod 7. In the general case, the vibration compensation device includes a planetary gear, a gearbox 11 is attached to the satellite 10 of the planetary gear, and the output shaft of the gearbox 11 is the output shaft 1. One end of the control rod 7 interacts with the gearbox 11, in particular with one of its elements, and the second end of the rod 7 is limited by an axis that is stationary relative to the body of the vibration compensation device. This axis can be the input shaft 3. In this case, the end of the connecting rod 7 has a guide with an axial slot that allows the connecting rod 7 to pass through the input shaft 3. An option is possible in which the guide passes through an axis spaced at a predetermined distance from the input shaft 3. It is also possible that the control rod 7 is made with a variable length, for example, telescopic. In this case, the second end of the connecting rod is freely mounted on the axis of the input shaft 3 or on a separate axis. A bearing can be used for free mounting. The mechanisms of interaction of the opposite end of the control rod 7 with one of the elements of the gearbox 11 depend on the type of gearbox used. Further, with specific examples, it is shown how the control rod 7 and the planetary gear can be used to control the angular speed of the output shaft 1. The options shown under the options differ in the type of gearbox 11 and the methods of fastening the control rod 7.

Figure 4:
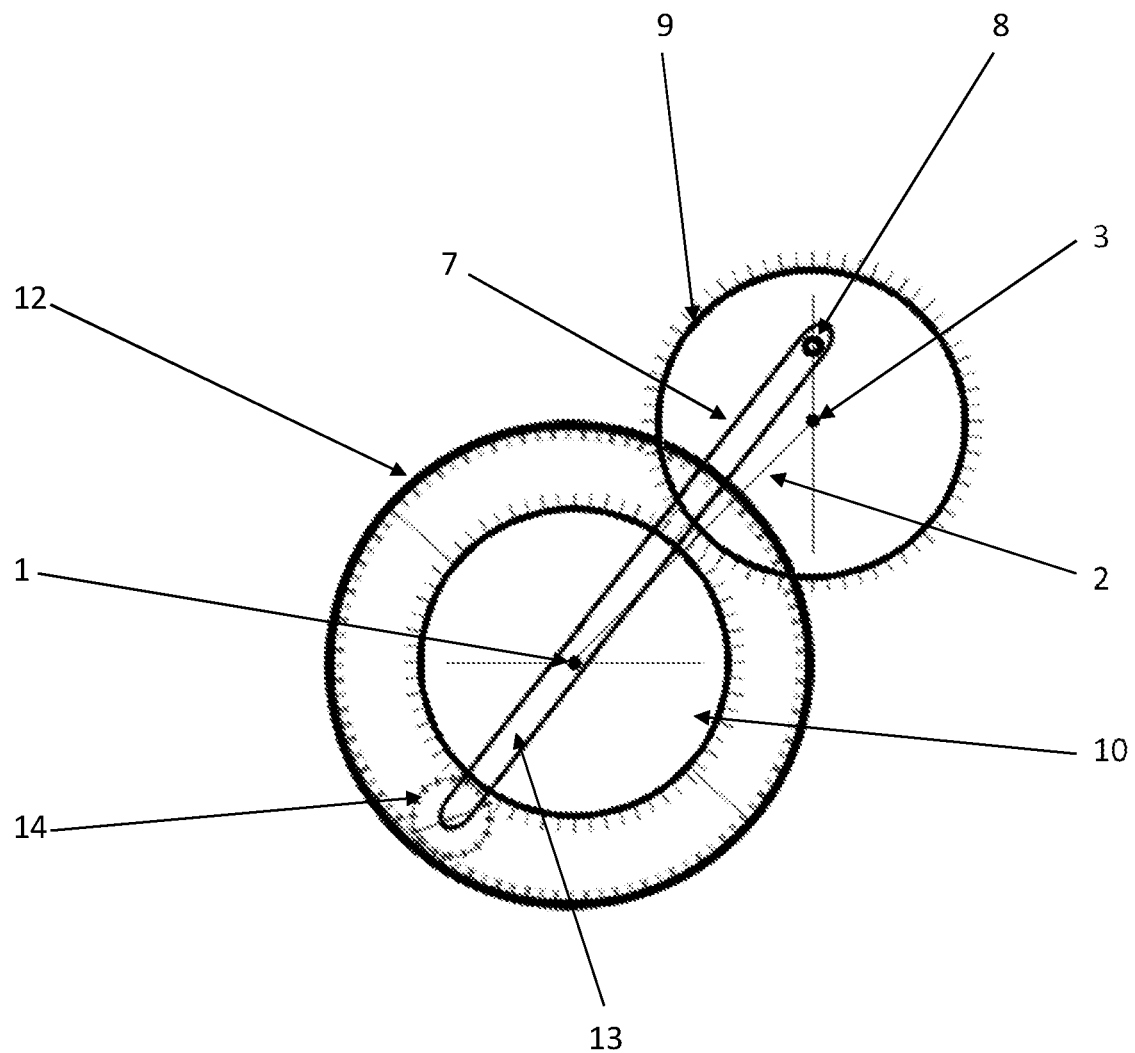
FIG. 4 shows a variant with a planetary gearbox used as a reducer.

According to the first variant, a planetary gearbox is used as a reducer 11. A simple planetary gearbox has three main components: a center sun gear, a carrier, and an epicyclic center gear. In the example shown, the satellite 10 (FIG. 4), on which the planetary gearbox is mounted, is at the same time the central sun gear of this planetary gearbox. And the epicyclic gear 12 of the planetary gearbox is connected to the output shaft 1. In this case, the end of the control rod 7 is fixed with the carrier 13. At least one satellite 14 is attached to the carrier 13. To obtain the required gear ratio on the carrier 13, paired satellites 14 of different diameters can be used, forming a two-row planetary gearbox. In order for the planetary gear and the planetary gearbox not to interfere with each other, the satellite 10 must protrude above the sun gear 9 so that the carrier 13 with the satellite 14 can rotate around the satellite 10 without obstacles without touching the sun gear 9. With the number of supports 4 equal to three and equal to the diameter of the gears 9 and 10, the ratio of the central epicyclic gear 12 to the central sun gear of the planetary gear should be 3 to 2. This ratio makes it possible to obtain ⅓ of the revolution of the output shaft 3 for one complete revolution of the input shaft 1.

Figure 5:
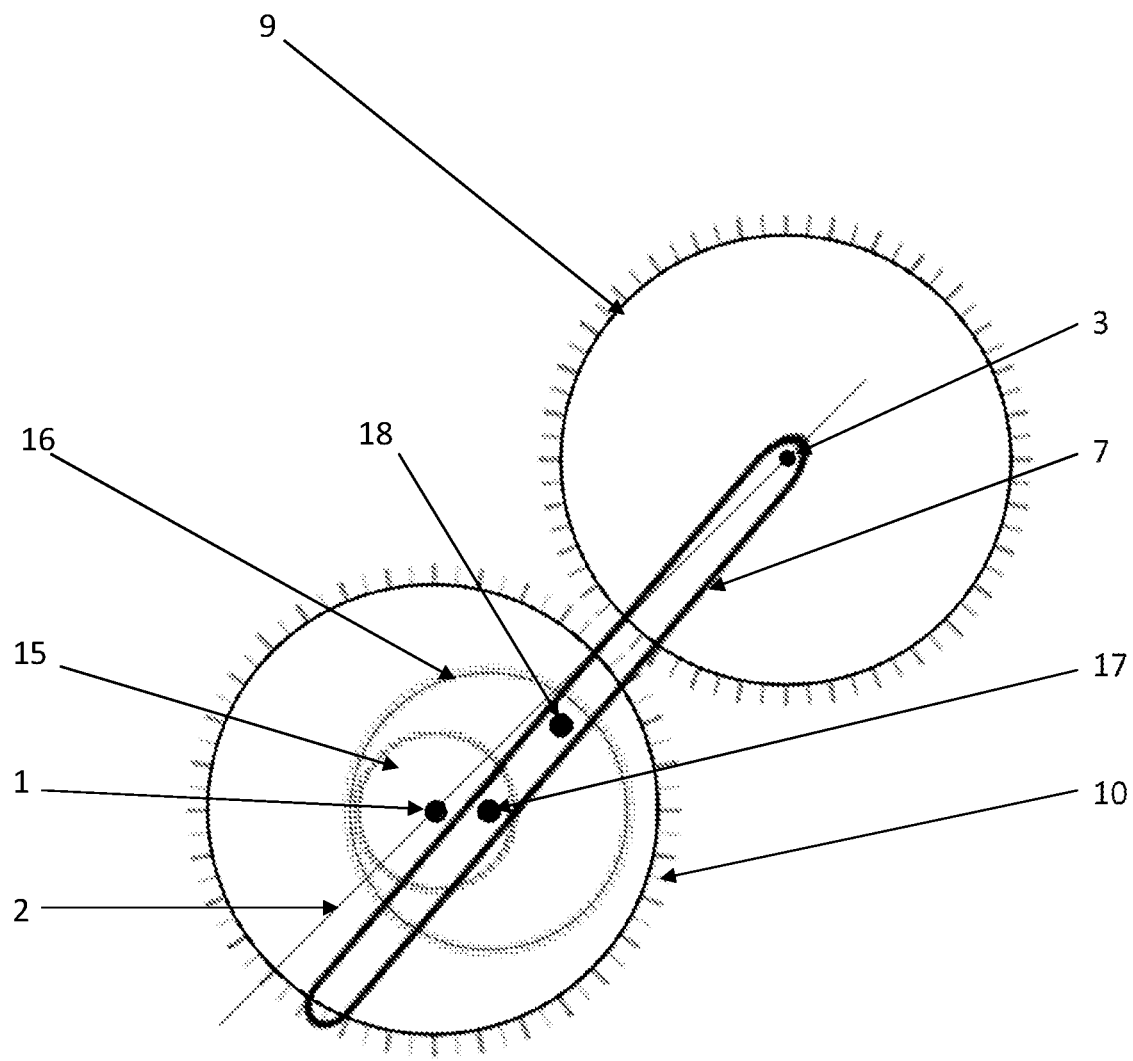
FIG. 5 shows a sub-option involving the use of a different type of gearbox.

The next sub-option involves the use of a different type of gearbox 11, consisting of a driven gear 15 (FIG. 5), located coaxially with the satellite 10 and connected to the output shaft 1. The reducer also includes a driving epicyclic gear 16. The axle 17 of this gear is mounted eccentrically on the satellite 10 at a predetermined distance from the output shaft 3 and with the teeth facing inward engages with the driven gear 15. The distance from the axis 17 to the center of the driven gear 15 affects the nature of the change in the angular velocity of the output shaft 3. The end of the control rod 7 interacts with the driving epicyclic gear 16. This interaction consists in the fact that the control rod 7 sets the direction of the driving epicyclic gear 16. There are several ways how this can be done, each of them does not change the essence of the present invention. FIG. 5 shows a method in which the driving epicyclic gear 16 has two pins 17 and 18, and the control rod 7 has a groove. This groove passes through both pins 17 and 18, so any rotation of the control rod 7 automatically turns the epicyclic gear 16 at the same angle. Such a groove can be at the other end of the control rod 7, and it can pass this groove through the input shaft 3. In this case, the control rod 7 can be rigidly fixed with the epicyclic gear 16. With the number of supports 4 equal to three and equal to the diameter of the gears 9 and 10, the ratio of the driving epicyclic gear 16 to the driven gear 15 should be 5 to 3. This ratio makes it possible to obtain ⅓ of the revolution of the output shaft 3 for one complete revolution of the input shaft 1.

Figure 6:
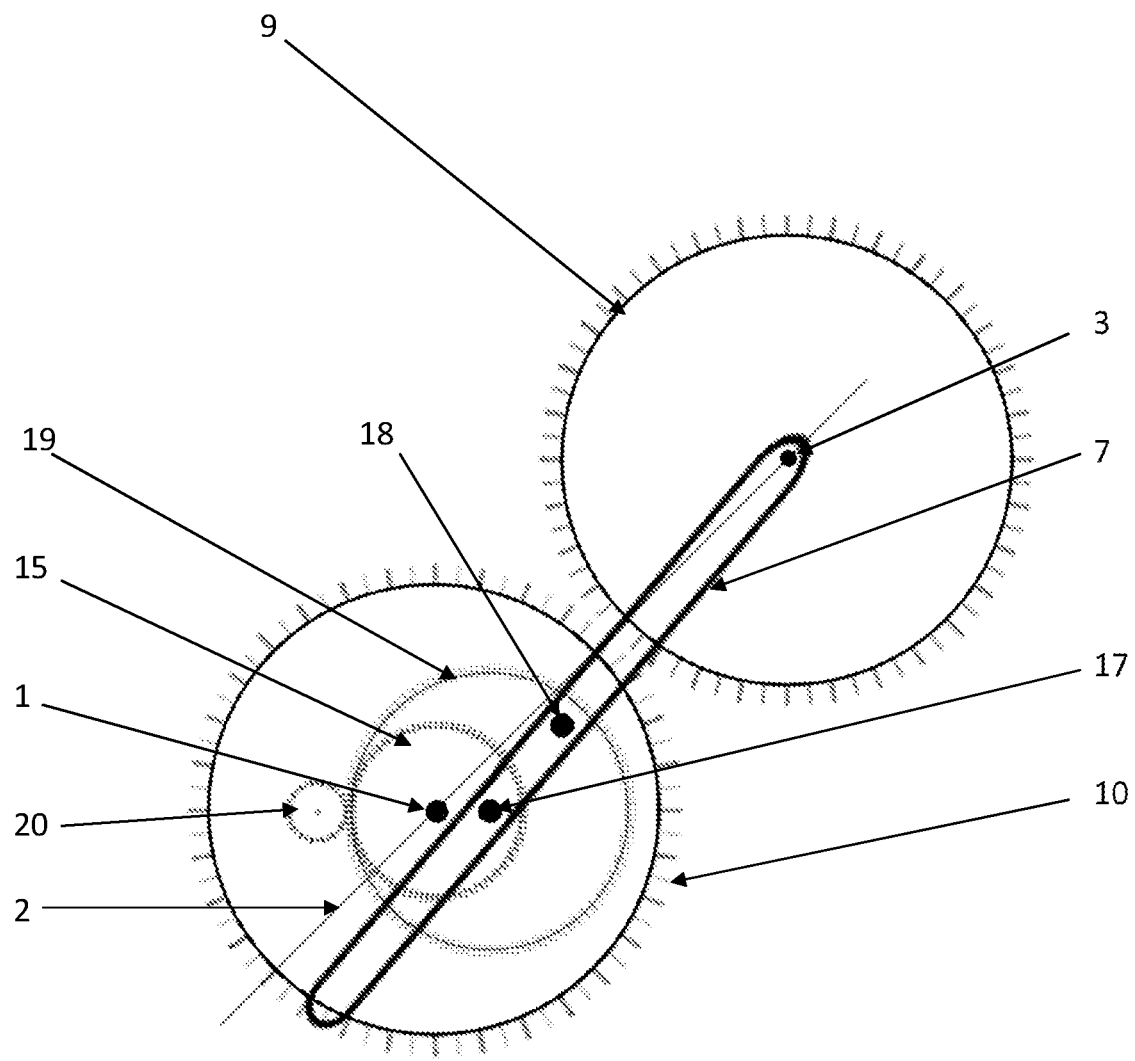
FIG. 6 shows another sub-option involving the use of a gear with teeth facing outward.

The next sub-option (FIG. 6) differs from the previous one in that instead of the leading epicyclic gear 16, a gear 19 with teeth facing outward is used. Its axis is also located, but the gear 19 itself must be in a parallel plane with respect to the driven gear 15. And the drive gear 19 and the driven gear 15 interact through one or more intermediate gear 20. The axis of the idler gear 20 is attached to the satellite 10. Otherwise, this and the previous one sub-alternatives are similar to each other. With the number of supports equal to three, the ratio of the driving gear 16 to the driven gear 15 is also 5 to 3.

Figure 7:
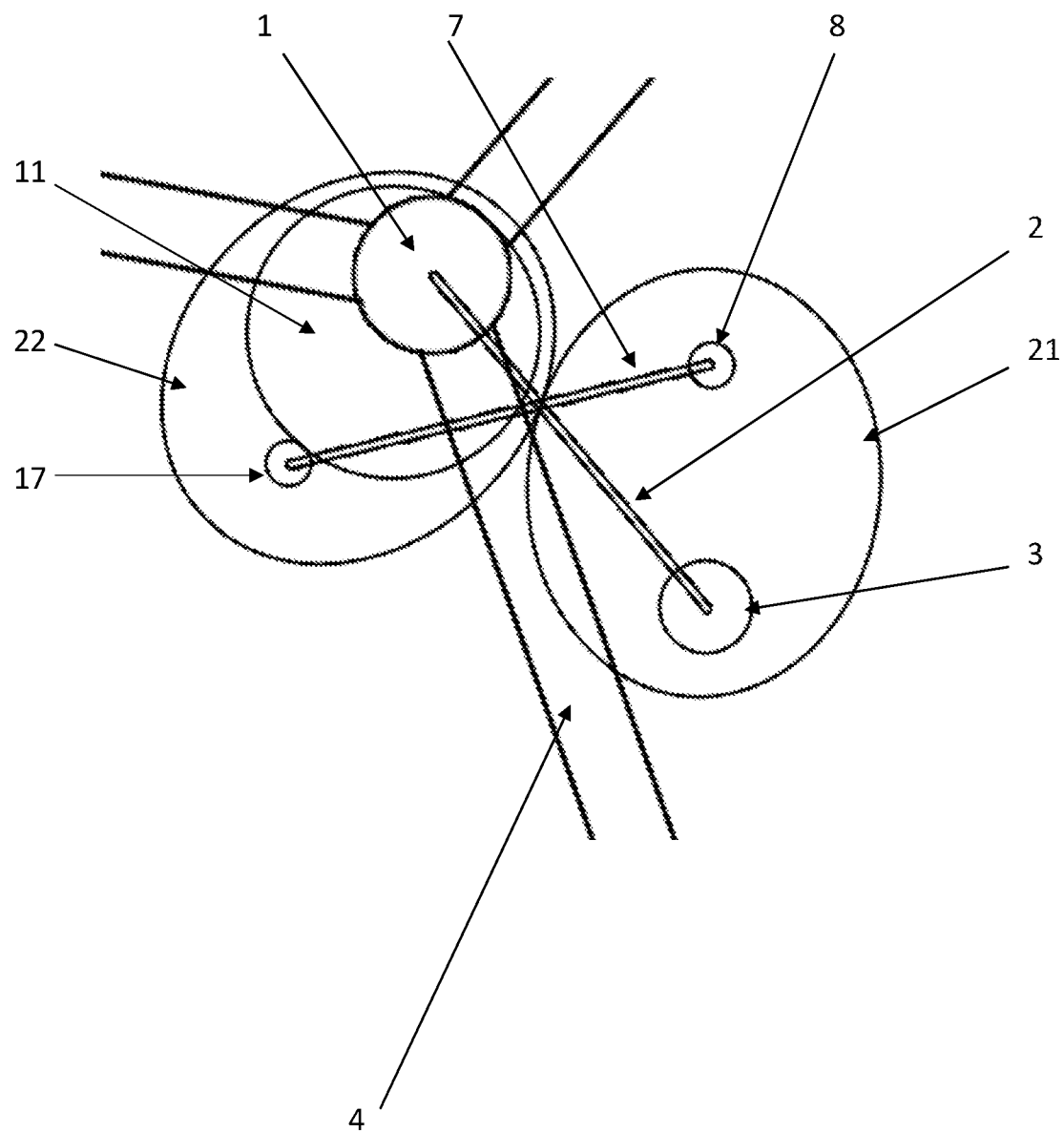
FIG. 7 shows a stationary sun gear with an elliptical shape.

Another option concerns the shape of the planetary gears. It is proposed to use a stationary sun gear 21 (FIG. 7) of an elliptical shape. And the satellite 22 that engages with it is of the same elliptical shape and the same size. The use of an elliptical shape makes it possible to make the control rod 7 of a fixed size and without axial slots. Both the crank 2 and the control rod 7 in this scheme have the same size and are mounted eccentrically, at the focal points of these elliptical gears of the planetary mechanism, in opposite focuses. A gearbox 11 is mounted on the satellite 22, which is controlled by a connecting rod 7 and rotates the output shaft 1 with supports 4.

The vibration compensation method is implemented as follows, which is the same for all of the above device options: the output shaft 1 (FIG. 8) on which several supports 4 are symmetrically fixed rotates at the free end of the crank 2. The crank 2 itself is driven by the input shaft 3. In this case, the output shaft 1 is rotated in the same direction and plane as the crank 2. But the output shaft 1 rotates slower than the crank 2, in particular when the number of supports 4 is equal to three for one full revolution of the crank 2, the output shaft 1 must turn ⅓ of a turn, but with a floating angular velocity. The angular speed of the output shaft 1 is changed depending on the current position and the angular speed of the crank. The change in the angular speed is made in such a way that the maximum angular speed of the output shaft 1 is in the upper position of the crank 2, in which one of the supports 4 is in a vertical position. And the minimum angular velocity of the output shaft 1 is obtained in the lower position of the crank 2, when the support 4 touches the surface at the smallest angle. The change in the angular velocity is carried out smoothly.

Figure 8:
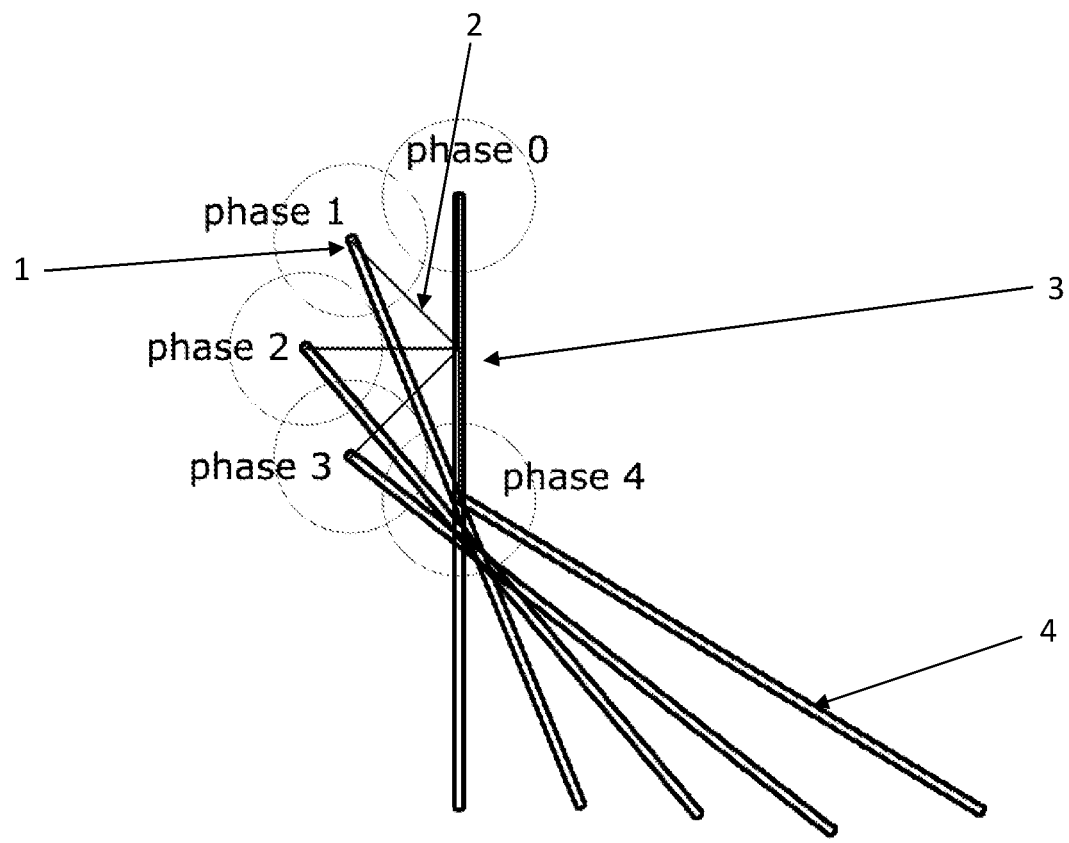
FIG. 8 shows the rotation of the crank in different phases of rotation.

For clarity, the rotation of the crank 2 in FIG. 8 is shown in the form of 4 main phases of rotation: 1st phase—turn from the upper vertical position by 45 degrees, 2nd phase—turn by another 45 degrees to the horizontal position of the crank 2. 3rd phase—turn from the horizontal position the next 45 degrees down, and finally the 4th phase—a turn of the next 45 degrees to the bottom vertical position. The greatest reduction in vibrations of both types (spatial and velocity) when using three supports 4 is observed if:

in the 1st phase, the output shaft 3 will rotate by about 22-23 degrees in the 2nd phase, the output shaft 3 will rotate 17-18 degrees in the 3rd phase, the output shaft 3 will rotate by about 11-12 degrees and in the 4th phase, the output shaft 3 will rotate by about 6.5-7.5 degrees.

When the crank 2 moves from the lower position to the upper position, the rotation of the output shaft 1 is carried out in the same way—in the lower position, the smallest angle of rotation, in the upper position, the largest.

This method and all of the above options for the mechanisms of the vibration compensation device make it possible to exclude cam mechanisms and springs in the proposed device, reduce the coefficient of friction and dimensions of the device and significantly reduce vibrations, both spatial and high-speed.

Thanks to the shown solutions and optimally selected parameters, vertical vibrations can be reduced to 5% of the length of the supports, and the fluctuations in the linear speed of the reference points can be reduced to 6.5% of their average speed.

The invention claimed is:

1. A method of compensating for oscillations of a wheel-stepper propulsion device, the method comprising:
   rotating an input shaft connected to a crank at a first free end to rotate an output shaft connected to the crank at a second free end, several supports being symmetrically fixed to the output shaft, and
   while the output shaft is rotating in the same direction as and in a plane parallel to rotation of the crank, changing angular velocity of the output shaft depending on position and angular speed of the crank.

2. The method according to claim 1, wherein for one complete revolution of the crank, the output shaft is rotated by 1/n revolution, where n is the number of supports fixed on the output shaft.

3. The method according to claim 1, wherein a maximum angular velocity of the output shaft is obtained in an upper position of the crank when one of the supports touching a surface is in a vertical position, and a minimum angular velocity is obtained in a lower position of the crank when two of the supports simultaneously touch the surface.

4. A vibration compensation device for a wheel-stepper propulsion device, comprising several supports symmetrically fixed on a transversely movable output shaft, comprising:
   an input shaft connected to a crank at first free end to drive the crank, wherein the output shaft is fixed at a second free end of the crank, and
   a variator configured to rotatably drive the output shaft to change the angular speed of the output shaft depending on a current position of the crank and angular speed of the crank.

5. The vibration compensation device according to claim 4, further comprising an encoder configured to determine the position and angular velocity of the crank, wherein the variator comprises a servo drive, including an electronic variator, which is connected to the encoder.

6. The vibration compensation device according to claim 4, wherein the variator includes a control connecting rod rotatable by the crank, when a fixed axis of the connecting rod is fixed at a predetermined distance from the input shaft.

7. The vibration compensation device according to claim 4, wherein the variator includes a planetary mechanism comprising a stationary sun gear fixed to a body of the vibration compensation device, a carrier and at least one satellite fixed to the carrier, the carrier being the crank.

8. A vibration compensation device for a wheel-stepper propulsion device, comprising several supports symmetrically fixed on a transversely movable output shaft, comprising:
   a planetary gear including a stationary sun gear fixed to a body of the vibration compensation device coaxially with an input shaft, a satellite engaging with a stationary sun gear of the same size, fixed on a crank that is a carrier,
   a gearbox mounted on the satellite, the output shaft being drivably connected to the gearbox,
   a control rod, one end of which is configured to interact with the gearbox, the other end being limited by an axis that is stationary relative to the body of the vibration compensation device.

9. The vibration compensation device according to claim 8, wherein the control rod has a variable length.

10. The vibration compensation device according to claim 8, wherein the gearbox is a planetary gearbox, one central gear is connected to the planetary gear satellite, and a second central gear is connected to the output shaft.

11. The vibration compensation device according to claim 10, wherein when the number of supports is equal to three, and the ratio of the supports to central gears of the planetary gearbox is 3 to 2.

12. The vibration compensation device according to claim 8, wherein the gearbox includes:
   a driven gear located coaxially with the satellite and connected to the output shaft,
   a driving epicyclic gear, meshed with the driven gear, wherein when a center of the driving epicyclic gear is shifted relative to a center of the driven gear, the one end of the control rod interacts with the driving epicyclic gear, and an axis of the driving epicyclic gear is eccentrically fixed on the satellite.

13. The vibration compensation device according to claim 12, wherein when the number of supports is equal to three, and the ratio of the driving epicyclic gear to the driven gear is 5to 3.

14. The vibration compensation device according to claim 8, wherein the gearbox includes:
   a driven gear located coaxially with the satellite and connected to the output shaft,
   a driving gear located in a plane parallel to the driven gear, wherein a center of the driving gear is shifted relative to a center of the driven gear, and wherein the one end of the control rod is fixed to the driving gear, and an axis of the driving gear is eccentrically fixed to the satellite,
   at least one idler gear, in simultaneous engagement with the driven and driving gears, wherein an idler gear axle is fixed to the satellite.

15. The vibration compensation device according to claim 14, wherein when the number of supports is equal to three, and wherein the ratio of the drive gear to the driven gear is 5 to 3.

16. The vibration compensation device according to claim 8, wherein the planetary mechanism includes an elliptically shaped fixed sun gear, a satellite engaging with the sun gear and having the same size and the same elliptical shape, wherein the sun gear and the satellite are connected by two connecting rods of fixed length, the two connecting rods being eccentrically fixed to the sun gear and the satellite, and wherein one of the connecting rods is the crank and the carrier, and the other of the connecting rods is the control rod.

\* \* \* \* \*